United States Patent [19]

Fonseca

[11] 3,967,957

[45] July 6, 1976

[54] AQUEOUS AMMONIA OXIDATIVE LEACH AND RECOVERY OF METAL VALUES

[75] Inventor: Anthony G. Fonseca, Ponca City, Okla.

[73] Assignee: Continental Oil Company, Ponca City, Okla.

[22] Filed: Mar. 26, 1973

[21] Appl. No.: 344,785

[52] U.S. Cl. .................................. 75/103; 75/108; 75/117; 75/119; 423/32; 423/36; 423/145; 423/150

[51] Int. Cl.$^2$ .................... C22B 15/10; C22B 23/04

[58] Field of Search ........... 423/150, 145, 143, 141, 423/42, 32, 33, 49, 36, 50, 55, 56, 58; 75/108, 103, 117, 119

[56] References Cited
UNITED STATES PATENTS

| | | |
|---|---|---|
| 2,576,314 | 11/1951 | Forward .............................. 75/103 |
| 2,647,819 | 8/1953 | McGauley ............................. 423/36 |
| 2,721,796 | 10/1955 | McGauley ............................. 75/103 |
| 2,726,934 | 12/1955 | Forward et al. ...................... 75/103 |
| 2,728,636 | 12/1955 | Van Hare et al. ................... 423/141 |
| 2,730,429 | 1/1956 | Abramson ............................ 75/108 |
| 2,822,263 | 2/1958 | Forward ............................... 75/117 |
| 3,397,130 | 8/1968 | Brantley et al. .................... 204/105 |
| 3,719,451 | 3/1973 | Burke .................................. 75/117 |

OTHER PUBLICATIONS

Mellor, *Treatise on Inorganic Chemistry*, Longman Greens New York, vol. 3, pp. 251–254, 1922.

*Primary Examiner*—Oscar R. Vertiz
*Assistant Examiner*—Brian E. Hearn

[57] ABSTRACT

Certain mineral values are recovered from source material such as ore, scrap metal, and mixtures in the presence of another metal thereof by aqueous ammonia leaching solution, and the mineral values are precipitated by ammonia from said solution as a complex, and the mineral values are recovered from said complex.

6 Claims, 1 Drawing Figure

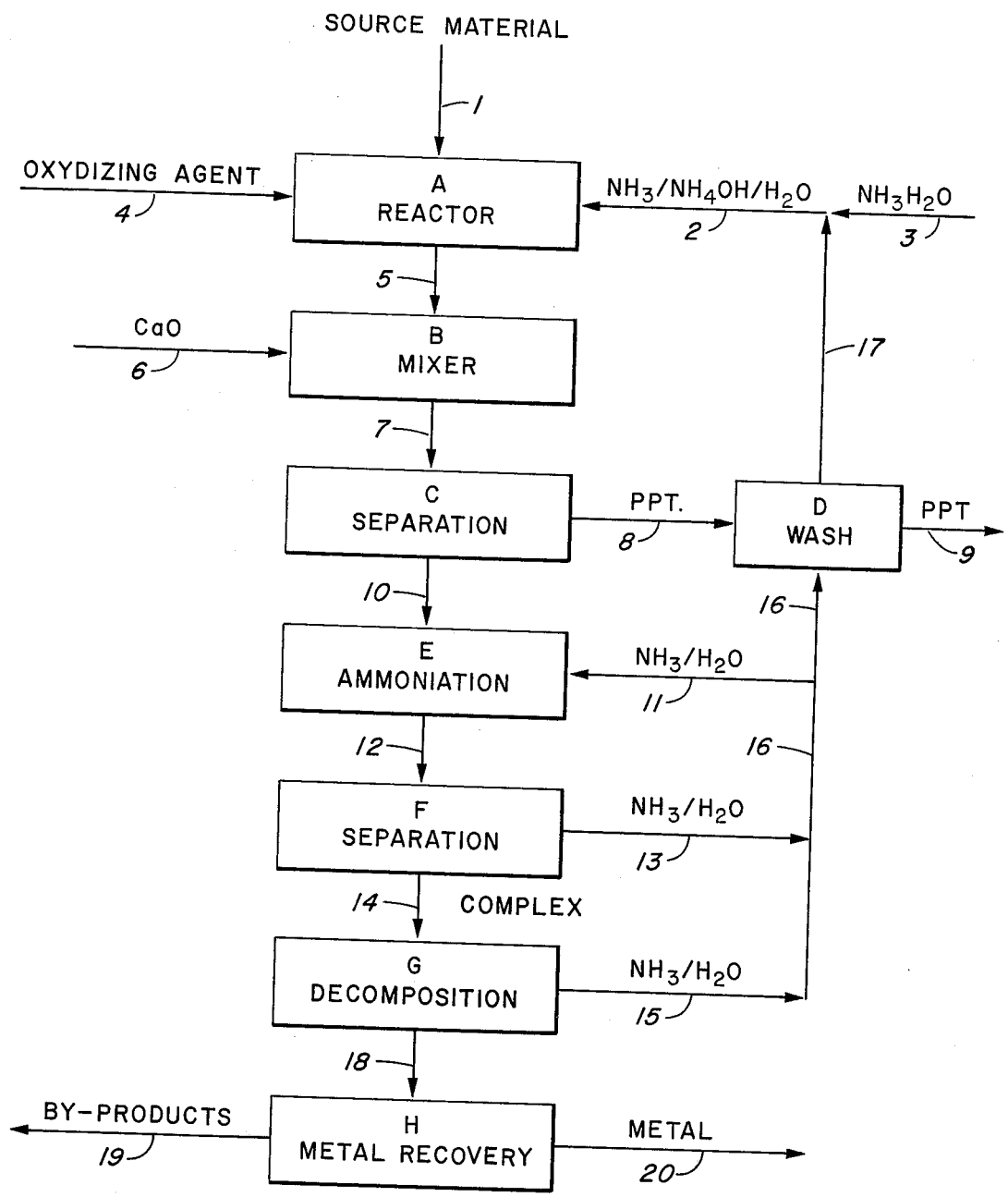

AQUEOUS AMMONIA OXIDATIVE LEACH AND RECOVERY OF METAL VALUES

This invention relates to recovery of mineral values from a source material, such as ore or scrap, using ammonia leaching tehniques. This invention is especially applicable to ores containing mineral values of copper, nickel, zinc, silver, or cobalt, even in the presence of iron and in the presence of another metal from the group.

The processes and compositions of this application are related to those described in a copending application filed herewith.

Metal ammine complexes have been used in leaching metals, such as copper, nickel, and cobalt, from a variety of ores. But, up to now, the only commercial installation utilizing metal ammine complexes in the recovery of these metals from the ores has been with the recovery of native copper or when nickel is present along with copper and/or cobalt.

This invention presents a preferred method utilizing an ammonia leach process for the recovery of a metal from sulfide ore or sulfide source material, especially copper, from chalcopyrite and other copper sulfide ore. In contrast to RLE (i.e., Roast-Leach-Electrowin) processing, a preferred process described here could be called LPDR (i.e., Leach-precipitation-Decomposition-Recovery). Its similarity to other ammonia leaching processes ceases after the initial oxidative-ammonia pressure leach.

A preferred process described herein is a simple, easy-to-operate process. Its heat and pressure vessel requirements are minimal. The only disposal problem is the easily filterable gypsum-iron oxide cake by-product. There is no water or material balance problem, and the ammonia is completely recycled. There is excellent separation of the copper, nickel, cobalt, and silver from iron which eliminates any iron problem when electrowinning and allows a very high loading to the cell. Thus capital outlay for electrowinning cells as well as cell operating costs would be low. The end products would be pure metal and fairly concentrated iron-free sulfuric acid. Above all, there is no pollution problem and no ammonia loss to ammonium sulfate as well as problems associated with its disposal or use.

This ammonia-oxidation-leach process has several unique processing steps which should make it economically feasible to use for the recovery of the metals nickel, cobalt, silver, and copper from sulfide minerals containing at least two of these metals. Nickel, cobalt, copper, silver, and zinc and other sulfide-containing ores are also amenable to this type of treatment. That is an ore having a substantial quantity, i.e., a recoverable quantity, of this metal with at least one other metal in a major or significant quantity.

By this invention, there is provided in a process for leaching a mineral value containing at least two metals from a group of preferred metals from a source material using an aqueous ammonium leach solution, the method characterized by precipitating the mineral value from said leach solution as a complex by pressurizing the aqueous leach solution with ammonia, separating said complex from said leach solution, and recovering said complex.

Generally, the precipitated or solid complex can be separated from the solution by any appropriate conventional means. The complex can be processed following separation by conventional methods to recover the mineral value and by-products, such as ammonium sulfate and/or ammonia, from the complex.

The process of this invention involves the recovery of mineral values from ore using ammonia oxidative leaching wherein the mineral values include at least one metal selected from a preferred group including nickel, copper, cobalt, manganese, molybdenum, tungsten and silver, platinum, palladium, gold, and uranium in the presence of at least one other metal from the group. Other metals such as iron, aluminum, lead, bismuth, mercury, cadmium, zinc, arsnic, magnesium, beryllium, yttrium, cerium, germanium, antimony, zirconium, tellurium, vanadium, and tin can be present because they precipitate or are not leached by ammonia oxidative leaching. Metals such as sodium, potassium, and lithium which remain in solution through the process can be present.

An illustrative process is directed to the recovery of copper mineral values from flotation concentrate and even a low grade ore. copper and other desired metals will be included in designation herein of copper alone through the ammoniation and second separation steps. This process includes the specific steps shown in the drawing. The invention will be described herein in terms of this preferred copper-sulfate process, that is, a system including copper mineral values. The sulfate can be produced by oxidizing sulfur in the source material by addition in subsequent treatment or by being in recycled solution from subsequent steps. Steps of this process are labeled with letters, and the flow streams are designated by numbers. These reference letters and numbers are included in this discussion in parentheses for ease in understanding the invention and not as a limitation because this process includes steps and features which can be considered optional or which can be modified by one skilled in the art in view of this disclosure.

An illustrative process comprises mixing or contacting in a reactor (A) the source material 1, which can be an ore, scrap (scrap metal), or a combination of ore and scrap metal, with an aqueous ammonia leach solution 2 and an oxidizing agent 4. The source material can be mixed with the ammonia solution and oxidizing agent either sequentially or in one step. The oxidizing agent is preferably oxygen, air, or an oxygen bearing gas. The ammonia solution can be fresh solution, solution recycled from subsequent steps, or a mixture of fresh and recycled solution.

Table 3 contains typical leach data showing the effect of variation of time-temperature of leaching and total pressure containing oxygen on leaching. This data was obtained on a well stirred solution, not highly agitated. With better agitation, better $O_2$ mixing would occur with quicker leaching. Solubilization of the copper occurs when the crystalline sulfide molecules are oxidized to a soluble sulfate. The ammonia oxidation of chalcopyrite is much more rapid than sulfuric acid oxidation under similar conditions because of the complexing ability of the ammonia molecule. The rate of solubilization of the copper from the solid ore particles is greatly increased by the formation of the very stable ammine complex.

Before leaching, an ore can be subjected to flotation concentration. No drying or additional grinding is necessary, as the concentrate is used as received. Chalcopyrite should be at least −150 mesh. Recycle ammonia and water (ammonium hydroxide) and any makeup ammonia are used in leaching with heat and oxygen, air pressure being applied. Time, temperature, and pressure data for the oxidation-leaching reaction are discussed herein. The copper is converted to a soluble ammine complex. Any iron is oxidized to the insoluble oxide $Fe_2O_3$. All sulfur in the ore is preferably oxidized to sulfate. The sulfate can be produced in the initial leach or during subsequent treatment.

In a continuous process, the ammonia-$H_2O$ in the leaching step would be the recycle stream from the ammoniator and washer and would already contain some solubilized copper ammine complex.

After sufficient reaction time, the slurry would then be charged to the mixer where lime (or slaked lime) is added to precipitate the excess sulfate. See Table 1 for the ratio of "excess sulfur" to copper. This excess sulfur is the sulfur (i.e., sulfate) that is present over and above that necessary for copper sulfate formation. It was found that the ratio of excess S to Cu with Ontario chalcopyrite ore is 1.18, while that with the Arizona porphoryl concentrate was 1.14. Therefore, that many moles of lime should be added to precipitate the excess sulfate as calcium sulfate. The particle size of the lime and the method of agitation determine if excess lime is needed due to calcium sulfate coating of the lime particles. This coating prevents further reaction of the lime with available sulfate. It was found that less than 12 percent excess lime was required when used with adequate agitation.

The source material or leach solution must contain a nonhydroxide anion, such as a halide, carbonate, phosphate, or sulfate, capable of forming a soluble complex with ammonia and the mineral value desired. For a preferred process wherein copper is the mineral value desired and iron is present in the source material, the preferred anion is sulfate. This can be supplied by sulfuric acid, by a sulfate salt, or by oxidizing sulfur in the source material. The sulfur can be combined with the source material as in sulfide ore.

With a preferred copper sulfide leaching process, the leaching solution 5 is optionally mixed (B) with a filtering aid 6 capable of reacting with and precipitating excess anion. A calcium salt or base, such as calcium oxide or calcium hydroxide, serves as excellent filter aid-reagents for this optional step with solutions containing copper and sulfate, especially with iron present. Calcium sulfate gypsum, or gyp cake, precipitates to remove excess sulfate and makes separation of iron oxide which also precipitates from the solution easier. Salts of other metals from Groups II, III, and VIII of the periodic table, such as magnesium, aluminum, zinc, strontium, cadmium, and barium, can be used to remove excess anion. Removal of excess anion at this point is not essential because the anion can be removed or recycled in a subsequent step, as will be apparent from this disclosure. For example, excess sulfate can be precipitated and removed as ammonium sulfate.

In the mixing step, slurry from the ammonia oxidation-leaching reaction is pumped to the mixer where lime or slaked lime is added to the slurry. Lime is used to precipitate the sulfate not required by the copper complex. The addition of lime accomplishes two purposes: (a) it removes the excess sulfate and (b) it enables the filtration and washing of the iron oxide to be accomplished easily. Without this removal, additional recovery, treatment, or disposal of ammonium sulfate would be required.

In the first separation step (C), the removal of unreacted material, mostly silica, as well as the iron oxide and calcium sulfate, is accomplished easily. Without the calcium sulfate, the very fine iron oxide sludge formed would be extremely hard to filter and wash. When it is mixed with calcium sulfate, an easily filterable and washable cake is formed. Reaction-leaching, mixing, and separation can be accomplished in the same vessel if desired.

Following treatment with filter aid-reagent, the leach solution 7 is subjected to a separation operation (C), which can be filtration decantation or any conventional separation method for separating precipitate (ppt) 8 from leach solution 10. For the above preferred process, the precipitate comprises calcium sulfate and iron oxide, which can also contain some occluded copper composition.

In a preferred process, the total time for mixing lime was less than 15 minutes. The slurry is filtered to remove the iron oxide-calcium sulfate and any unreacted residue. X-ray identification of the unreacted chalcopyrite residue or filter cake indicates that it is almost pure silica.

The filter cake is optionally washed with recycle aqueous ammonia. Countercurrent washing would be preferred, while four to five washings are generally enough to remove practically all adhering copper ammine complex.

The cake is digested in aqua regia to determine the amount of copper and other metal not leached in the process. Any adhering metal as well as any unreacted metal material is solubilized by the aqua regia. The amount of unrecovered copper is shown in Table 3. All unreacted copper, copper compounds and other metals not removed from the cake by aqua regia are considered to be unrecoverable. There is a slight amount of copper precipitated in the gyp cake following washing by the lime addition, but it is less than 0.2 percent of the total copper in the ore. The gyp cake is ready for disposal.

As shown in the drawing to remove any occluded copper composition, the precipitate can be optionally washed (D) with aqueous ammonia solution 16 to dissolve copper as a complex. This ammonia solution with redissolved copper complex can be recycled 17 to the contacting step (A) with any makeup ammonia or aqueous ammonia solution 3 required. The washed precipitate 9 is passed to conventional processing or disposal for by-product. Typically, there is a very slight loss of copper values which would be included in the cake.

For the preferred copper-sulfate system, the leach solution 10 containing dissolved copper-ammonia-sulfate is next ammoniated or pressurized with ammonia (E) or aqueous ammonia which can be recycled 11 and 16 from subsequent steps. It has been unexpectedly discovered that the mineral values, which were dissolved as a complex with ammonia, precipitate as a complex when pressurized with ammonia. The soluble complex copper ammine sulfate solution enters a low pressure ammoniator (Step E) where ammonia is used to precipitate an insoluble complex ammine. The complex is precipitated by the application of low pressure ammonia. The slurry is filtered (Step F), leaving the solid copper ammine sulfate wet with $NH_4OH$. The gas-liquid stream 13 is recycled. No washing of the complex is necessary. Typically, more than 99 percent of the copper is precipitated in this step.

The filtrate 10 from the first separation step contains excess ammonium hydroxide and the soluble copper ammine sulfate with only traces of iron (i.e., less than 100 ppm). When this solution is pressurized with ammonia to a pressure in the range of about 5-95 psig, the soluble copper complex precipitates as an insoluble complex. With a constant pressure of 65 psig, $NH_3$, >99.6 percent of the copper is generally precipitated as the copper ammine sulfate monohydrate $[Cu(NH_3)_4SO_4.H_2O]$, $[CU(NH_3)_4(H_2O)_2SO_4.H_2O]$, and possibly $[CU(NH_3)_6SO_4.H_2O]$. See Table 4 for chemical composition of precipitate complex. After filtration, the solution is essentially colorless containing less than 100 ppm of copper and iron and is recycled to washing steps and to the ammoniator for reuse. Any sulfate that was not precipitated in the lime precipitator is precipitated along with the copper complex as ammonium sulfate. Therefore, there is no accumulation of any soluble salts in the recycle circuit.

The exact nature of the ammoniation on pressurization precipitation is not clear, but one hypothesis is that the nature of the aqueous medium or solution changes with ammonia pressure. The ammonia range of temperature and pressure which can be used for each mineral value and anion combination can be readily determined in view of this disclosure. For the preferred copper-sulfate system, the preferred temperature range is about 15°-40°C, and the preferred pressure range is about 1.2-3.5 atmospheres (atm) absolute (0.2-2.5 atm gauge). For most systems, ammoniation can be conducted in the temperature range of about 10°-80°C and in the pressure range of about 1.1-5.5 atm absolute (0.1-5.5) gauge.

Following the ammoniation step (E) and precipitation of the mineral values as a complex, the mixture 12 is subjected to a separation step (F) where the precipitate 14 is separated from the aqueous ammonia liquor 13. As used herein, complex refers to an association of certain components to make the mineral values soluble or insoluble and does not refer to the exact nature of chemical combination or reaction. The precipitate passes to the next step (G), decomposition, and the aqueous ammonia solution can be recycled to ammoniation, washing or reacting (i.e., leaching) steps of the process with makeup aqueous ammonia as required.

In Step G, the "wet" solid complex is heated to drive off the ammonia and to decompose the ammine complex. The solid complex is decomposed to solid $CuSO_4$ liberating $NH_3$ and some $H_2O$, which is recycled. In the decomposition step, the solid copper ammine sulfate monohydrate is heated to recover the ammonia and produce anhydrous copper sulfate for eventual copper recovery. The initial application of the temperature required for decomposition can cause some sulfate decomposition. Therefore, the decomposition process should be either a gradual heat process or a two-stage heat process. In a preferred process, a rotary furnace two-stage heat process was found to be satisfactory. Agitation makes faster heating possible. Decomposition for 30 minutes at 340°C followed by decomposition for 1 hour to 1¼ hours at 380°C will produce a slightly off-white solid material (anhydrous copper sulfate). Fluid bed decomposition reduces this time by almost 40 percent. Table 5 contains typical data showing the amount of nitrogen (ammonia) remaining after heat treating at various temperatures and for different time periods. At the optimum time (less than about 3 hours) and temperature (above about 100°C), the loss is less than about 1.6 pounds of $NH_3$ per ton of copper.

For the process of this invention all of the desired mineral values or metals are precipitated together in the ammoniation or pressurizing step (E). The solid complex separated in step F contains all of these metals.

As shown in the drawing, in the decomposition step (G), the mineral value complex is at least partially decomposed, and ammonia 15 which can be recycled is recovered. Conventional decomposition means can be used for this step. Heating the complex is a preferred method because the degree of decomposition can be accurately controlled, and the ammonia will also contain water which can be recycled, With the preferred copper-sulfate system, the complex is preferably completely decomposed, leaving copper sulfate salt 18 which can be processed by conventional metal recovery means (H), such as chemical reduction with hydrogen, a higher cation such as iron cementation, and electrolytic reduction or electrowinning. The decomposition can be conducted by heating the complex 14 in the temperature range of about 50°-380°C. For the preferred copper-sulfate system, the range is about 150°-380°C. For some metal-anion systems, partial decomposition can be advantageous. In such cases, ammonia remaining in the complex can maintain the metal values in an easily processed state, and the ammonia will react to produce a byproduct composition 19, such as ammonium sulfate, and elemental or reduced metal 20 is available for conventional purification or use. Vacuum and purge gas can also be used with heat or as a substitute for heat in the decomposition step.

For a preferred process of this invention the complex is decomposed to the diamine. That is, the ratio of ammonia: anion (such as sulfate) remaining in the complex is in the range of about 1.5-2.2:1 and preferably 1.8-2.1:1 or about 2.0:1. This complex has advantages for subsequent reduction of the metal ions by chemical means such as hydrogen reduction or iron cementation or by electrolysis means. The diamine complex is readily soluble for subsequent reduction of metal ions. The diamine also permits reduction of copper, nickel, and cobalt in series with the pH remaining near 7 so that the solution is not too basic or acidic for reduction of the metal ion. When reducing the metal ions with copper, nickel and cobalt present the copper is reduced first and precipitates or plates out of solution first. The nickel is reduced next and cobalt reduces when the nickel:cobalt molecular ratio in solution reaches about 1.0:1.0. If silver is present in the solution, it will reduce along with copper. Convention methods for separating the metals either after or during reduction can be used; for example, Recovery of metals from a solution of partially decomposed diamine complex produced by a process of this invention can be accomplished as described in *Advances in Extraction Metallurgy* on the April 1967 London Symposium of The Institute of Mining and Metallurgy, published 1968 by J. W. Arrowsmith Ltd., Winterstroke Road, Bristol 3; in *Copper Metallurgy* edited by Ehrlich, 1970 Symposium of Extrative Metallurgy Division of the Metallurgical Society of the American Institute of Mining, Metallurgical and Petroleum Engineers, New York, and in the 1972 publication on *International Symposium on Hydrometallurgy* 1973, by the same Metallurgical Society. Briefly stated, the recovery of copper in the presence of nickel and cobalt from a solution of decomposed diammine complex can be accomplished by selective hydrogen reduction. Copper will be removed before nickel, then the nickel can be removed before the cobalt is precipitated. There are various commercial methods of separating copper, nickel and cobalt from solution once the ratio of ammonia: metal is in the region of about 2:1. A general procedure for recovering copper and silver is described as follows:

In Step H, the solid copper sulfate then is reduced to elemental copper by either of two methods:

a. electrowinning of an aqueous solution of the salt or
b. reduction with hydrogen of the solid (or aqueous solution of the salt) to copper powder. Both methods are viable, and only an engineering and economic evaluation of both would indicate which would be better for any given installation. Other conventional metal recovery methods can also be used. For electrowinning, the anhydrous salt can be dissolved in water, especially if slightly acidic. Since there are no impurities that interfere with the electrowinning processing, the only limitation on the concentration of $CuSO_4$ solution that could be used is the concentration of sulfuric acid produced by electrolysis. That is, solid copper sulfate could be added to the electrowinning cell until the accumulation of sulfuric acid impeded further operation. This sulfuric acid solution would contain some copper. The amount would be determined by the lowest limit of cell operation. But since most commercial copper operations will involve some sulfuric acid leaching of copper oxide ores, only traces of copper in the acid are lost in operating stream.

Another feasible method of copper recovery involved the reduction of the solid with $H_2$ at temperatures of 450°C or higher. Copper powder and a concentrated stream of $SO_2$ is produced by the reduction process. The $SO_2$ can be converted to sulfuric acid by presently known technology or can be converted to elemental sulfur by reducing part of the stream to $H_2S$ and then recombining both streams in a Claus unit. Experiments have shown that some calcium sulfate is present in the copper powder from hydrogen reduction producing less than 98 percent purity Cu. If this calcium sulfate problem cannot be avoided, compaction of the powder and electro-refining would be necessary for this recovery method.

The overall chemical reaction is represented in Equation 1:

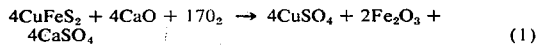

The chemical reactions for each step in the process are shown by Equations 2–5:

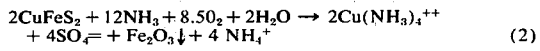

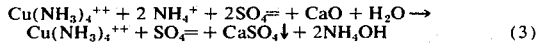

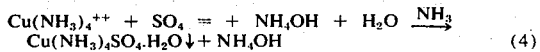

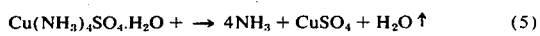

The recovery of the copper from the copper sulfate produced in Equation 5 can be accomplished by several methods, electrowinning and hydrogen reduction being the two most feasible methods. These are described in slight detail herein.

The preferred process is in essence a four-step process: Leach (solubilizing the copper), precipitation (concentrating and separating the copper product), decomposition (recovery of the processing materials), and recovery (obtaining elemental Cu). Air (oxygen) sulfide ore and hydrogen, if used, constitute the input, while elemental copper, sulfuric acid ($SO_2$), and the filter cake precipitate (residue $CaSO_4$—$Fe_2O_3$) are the output products of the process. All other processing materials are totally recycleable.

Ore, even low grade ore, is the preferred source material. Any copper-bearing mineral sulfide can be used in the process. The data presented here is typical of chalcopyrite from Temagami, Ontario, Canada, and an Arizona porphoryl concentrate. Table 1 shows the analyses of these ores.

The ore is preferably sized or ground to at least −150 mesh (i.e., it passes through a −150 mesh Tyler screen) and will leach more readily than coarse ore. Table 2 shows the copper recovery by leaching −150 mesh and −325 mesh ore. Most of our data represents −150 mesh ore, while the Arizona porphoryl flotation concentrate is used as received.

Typically, it was found that for −150 mesh chalcopyrite ore, a leaching time of 1 hour at 300 psig total gas pressure with $O_2$ (1.54 atm $O_2$ at STP) at a temperature of 150°C would solubilize greater than 98 percent of the copper. Recoveries as high as 99.90 wt percent can be readily obtained.

From our model reactor, we found that a ratio of one part ground ore to 4 parts liquid was about the minimum solid to liquid ratio for 98 percent copper recovery. A slurry ratio of at least 1:1 parts ore to liquid and preferably about 1:4–1:20 is preferred for leaching. A minimum concentration (e.g., about 5 wt percent) of ammonia in water can be used with satisfactory results. However, since 29 percent $NH_4OH$ can be easily handled and extra $NH_3$ will be used in subsequent steps, it is advantageous to use this concentration of ammonia in the initial reaction.

Mineral values which can be recovered by the process of this invention are generally metals of Classes I, II, and VIII of the periodic table. These metals include copper, nickel, cobalt, silver, cadmium, zinc, chromium, gold, platinum, palladium, and generally any metal which normally forms a single or double salt soluble complex with ammonia under aqueous ammonia oxidative leaching conditions. Two or more of these metals are present. They will be precipitated together and separated by certain decomposition and recovery methods. Certain other metals do not interfere with the process since they either are not leached from the material or are precipitated by the ammonia leach solution. For example, iron, aluminum, magnesium, manganese, mercury, tin, lead, calcium, strontium, and barium precipitate as the hydroxide, oxide, or some other form. Alkali metals such as sodium, potassium, and lithium remain soluble through the process and generally do not interfere with recovery of the desired mineral values.

Mineral values which can be used for the process of this invention include ores of metals such as acanthite, $Ag_2S$; adamite, $Zn_3(AsO_3)_2 \cdot H_2O$; aguilarite, $Ag_2S \cdot Ag_2Se$; aikenite, $2PbS \cdot Cu_2S \cdot Bi_2S_5$; adabandite, MnS; alvite, silicate of Zr, Ce, Y, Ca, Mg, Be, Cu, Zu and $H_2O$; amalgam, $Ag_2Hg_3$-$Ag_{36}Hg$; anhydrite, $PbSO_4$; argentite, $Ag_2S$; argyrodite, $Ag_8GeS_6$; arrhenite, silico tantalate of Y, Ce, Zr, Al, Fe, Ca, Be, etc.; atacamite, $CuCl_2.3Cu(OH)_2$; berzeliamite, $Cu_2Se$; billietite; bornite, $Cu_5FeS_4$; bournonite, $3(Pb,Cu_2)S.Sb_2S_3$; braggite; brannerite; brochantite, $CuSO_4—3Cu(OH)_2$; bromzrite, AgBr; calaverite, $AuTe_2$; caledonite, $2(Pb,Cu)O.SO_3.H_2O$; canfieldite, $Ag_8(Sn,Ge)S_6$; carnotite, $K_2O.2U_2O_3.V_2O_5.2H_2O$; cassiterite, $SnO_2$; cayeuxite; cerargyrite, AgCl; chalcanthite, $CuSO_4.SH_2O$; chalcocite, $Cu_2S$; chalcomenite, $CuSeO_3.2H_2O$; chalcopyrite, $CuFeS_2$; chillagite, $3PbWO_4.PbMoO_4$; chrysocolla, $CuSiO_3.2H_2O$; cobaltite, $CoS_2.CoAs_2$; cobaltpyrite, $(Fe,Co)S_2$; cooperite, PtS; covellite, CuS; cuprite, $Cu_2O$; cuprosklodowskite, $CuO.2UO_3—6H_2O$; cuprotungstite, $CuWO_4$; davidite; descloizite, $4(Pb,Zn)O.V_2O_5.H_2O$; diderichite; dioptase, $CuO.SiO_2$; djalmaite; dumontite; dyscrasite, $Ag_3Sb$; electrum; ellsworthite; embolite; enargite, $3Cu_2S.As_2S_5$; eucairite, $Cu_2Se.Ag_2Se$; freieslebenite, $2Ag_2S.3PbS.2Sb_2S_3$; gahnite, $ZnAl_2O_4$; gerhardite, $3 Cu(OH)_2.Cu(NO_3)_2$; germanite; glaucodot; greenockite, CdS; hessite, $Ag_2Te$; libethenite, $4CuO.P_2O_5.H_2O$; linarite; linnaeite, $CoS.Co_2S_3$; malachite, $CuCO_3.Cu(OH)_2$; metatorbernite, $Cu(UO_2)_2.P_2O_8.8H_2O$; metazennerite, $Cu(UO_2)_2As_2O_8.8H_2O$; miargyrite, $Ag_2S.Sb_2S_3$; molybdenite, $MoS_2$; nagyagite; naumannite, $(Ag_2Pb)Se$; olivenite, $4CuO.As_2O_5H_2O$; paraschoepite, $SUO_3.9½H_2O$; petzite; polybrasite, $9Ag_2S.Sb_2S_3$; polydymite, $Ni_3S_4$; pyrargyrite, $3A_{g}S-Sb_2S_3$; rauvite; sengierite, $2CuO.2UO_3.V_2O_5.10H_2O$; soddyite; sphalerite, ZnS; stannite, $FeS.Cu_2S.SnS_2$; stephanite, $5Ag_2S—Sb_2S_3$; sternhergite, $Ag_2S.Fe_4S_5$; slibnite, $Sb_2S_3$; stromeryerite, $Ag_2S—Cu_2S$; sylvanite, $(Au,Ag)Te_2$; tennantite, $5 Cu_2S—2ZnS.2As_2S_3$; tenorite, CuO; tetrahedrite, $3Cu_2S.Sb_2S_3$; tobernite, $Cu(UO_2)_2.P_2O_8.12H_2O$; turquois, $3Al_2O_3.CuO.2P_2O_5.9H_2O$; ullmannite, NiSbS; ultrabasite, $28PbS.11Ag_2S.3GeS_2.2Sb_2S_3$; uranochalcite, $UO_3.SO_3.CaO.CuO.H_2O$; vandenbrandite, $CuO.UO_3.2H_2O$; wurtzite, ZnS; and zeunerite, $Cu(UO_3)_2As_2O_8.8H_2O$.

These minerals can generally be classed as sulfides, silicates, carbonates, oxides, phosphates, arsenates, tungstates, selenates, nitrates, aluminates, stannates, sulfates, and halides of copper, silver, zinc, uranium, iron, antimony, tellurium (telluranate), vanadium, tin, selenium, tungsten, molybdenum, platinum, and cobalt.

EXAMPLES

The following examples illustrate the process and various features of the invention. Parts, percentages, ratios, and concentrations are by weight unless indicated otherwise. Pressures shown herein are gauge pressure unless indicated otherwise. Pressures shown herein are gauge pressure unless indicated otherwise, such as by psia (pounds per square inch absolute), atm ab (atmospheres absolue). Standard temperature and pressure of 0°C and 1 atm are indicated by STP.

EXAMPLE 1

About 20–30 grams (g) chalcopyrite ore ($CuFeS_2$) is mixed with about 100 milliliters (ml) of aqueous ammonia solution containing about 29 percent ammonia ($NH_3$). The mixture is pressurized with oxygen to supply about 5.5 moles of oxygen per mole of $CuFeS_2$. The mixture is stirred for 30 minutes and heated to about 150°C. The mixture is filtered to remove solid $Fe_2O_3$, which is washed with aqueous ammonia to remove any occluded soluble copper complex. The filtrate and wash liquid is pressurized with ammonia to about 65 pounds per square inch gauge (psig) to precipitate copper complex and ammonium sulfate as solids. These solids are separated from the solution by filtration, and the solids are heated to 425°C for about 30 minutes. Gas is evolved during heating, which consists of water, ammonia, nitrogen, and $SO_2$, leaving $CuSO_4$. The $CuSO_4$ is dissolved in water for subsequent metal recovery.

EXAMPLE 2

10 g Arizona porphoryl concentrate is added to 40 ml of regent ammonium hydroxide (approximately 29 wt percent $NH_3$). The mixture is pressurized to 70–80 psig with $O_2$ and heated to 150°C. Final pressure adjustment is made, and a constant pressure of 300 psig is maintained on the stirred solution during a 1 hour reaction. The slurry is agitated and the mixture is filtered. Filtration is greatly aided and improved by gypsum, $CaSO_4$, formation as described herein. The slurry is filtered to remove any unreacted material, silica and iron oxide.

The residue cake is washed with recycle $NH_3/H_2O$. The cake (i.e., gypsum and iron oxide and residue) is washed to remove occluded copper material. The cake is digested in aqua regia for the determination of copper not recovered by the ammonia precipitation.

The filtrate is pressurized at room temperature with $NH_3$ to the desired pressure. Pressures of 10–65 psig are generally satisfactory for the precipitation of the complex ammine. Filtration separates the copper ammine complex from an almost copper-free ammonia solution.

Heating the solid to temperatures as indicated in Table 5 produces anhydrous copper sulfate. Ammonium sulfate is also present unless excess sulfate (i.e., sulfate in excess of that required to form a complex) is removed by precipitation with lime (or slaked lime). This is accomplished by adding lime, 4.1 g $Ca(OH)_2$ in this example, to the slurry produced from the initial ammonia leach of the Arizona porphoryl concentrate.

Fluidization of the ammonia precipitated solid while increasing temperature during fluidization required about 40 percent less time for decomposition of the complex than the batch rotary furnace process described.

EXAMPLE 3

If only partial decomposition is desired, heating the ammonia precipitated copper ammine complex at 195°C for 45 minutes produced a compound with the following analyses:

13.8 percent N and 50.2 wt percent $SO_4$. Theoretical N percent for $Cu(NH_3)_2SO_4$ is 14.47 wt percent and 49.6 wt percent for $SO_4$. The decomposed sample contains about 4 percent less than the theoretical amount of nitrogen (ammonia) for the diammine compound. This solid can be redissolved in $H_2O$ for copper recovery (pH 5.2). Recovery can be accomplished by electrowinning the solution producing elemental $Cu°$ and a solution of ammonia sulfate or $H_2$ reduction at elevated temperature and pressure to produce elemental $Cu°$ and a solution of ammonium sulfate.

EXAMPLE 4

One embodiment of this patent can be used in the treatment of and recovery of solid ammonium sulfate from aqueous solution. Sulfite can also be recovered in this manner. It was observed that ammonia pressure in the same range for copper ammine precipitation will reduce, by precipitation of ammonium sulfate, the solubility of ammonium sulfate in water to a very low value. Thus, the solubility of $(NH_4)_2SO_4$ in $H_2O$ was observed to be only 3.9 g/100 g of solution at 50 psig $NH_3$ pressure, while the $(NH_4)_2SO_4$ solubility is 70 g/100 g in $H_2O$ and 11.5 g/100 g in concentrate (approximately 29 wt percent) ammonium hydroxide.

EXAMPLE 5

Ammonia pressure precipitation of the copper ammine complexes was observed at various pressures. Pressure ranges from 5 to 95 psig $NH_3$ can be used. Essentially the same amount of metal ion complex remains in solution at 65 psig as is at 95 psig. At 45 psig the amount of metal ion complex remaining in solution is slightly greater (about 50 ppm) while at 25 psig it is an even greater amount but still not exceeding 100 ppm metal ion in solution. At 10 psig the amount of metal ion complex not precipitated by $NH_3$ was approximately 1,700 ppm. (0.17 wt percent, 1.7 g/liter) at 5 psig $NH_3$ pressure the amount of metal ion remaining in solution was approximately 0.8 wt percent, $8gCU^{++}$/liter.

EXAMPLE 6

An ammonical sulfate solution having metal concentrations of a typical mineral ore leach liquor containing metal ions in the concentrations of $Ni^{++}$ 35.3 g/liter, $Cu^{++}$ 10.07 g/liter, $Co^{+++}$ 3.54 g/liter, and approximately 170 ppm $Fe^{+++}$ was subjected to ammonia pressure at 65 psig and room temperature (some ice cooling was necessary to prevent temperature increase from heat of reaction). Ammonia pressure was released and mixture filtered. The solid was purple-blue in color. The resulting filtrate contained the following concentrations of metal ions by analysis: $Ni^{++}$ <5 ppm; $Cu^{++}$ 9 ppm. $Co^{+++}$ 16 ppm, $Fe^{+++}$ <4 ppm. Therefore, the ammmonia pressure at 65 psig essentially precipitates substantially all the metals as metal ammine sulfates.

EXAMPLE 7

The solid metal ammine precipitated from Example 6 was subjected to thermal decomposition under the conditions shown in Table 6. The data shows the effect of the time and temperature on decomposition. To obtain the desired 2:1 ratio of ammonia to sulfate heating the metal ammine mixture at 250°C for about 0.5 hour is necessary.

EXAMPLE 8

Solid $Cu(NH_3)_4SO_4.H_2O$ (5 g) precipitated by ammonia pressure, was heated for 45 minutes at 195°C. A weight loss of 1.4 grams was observed. The product was green-blue in color and analyzed at 13.8% N and 50.2% $SO_4$. Theoretical N % for $Cu(NH_3)_2SO_4$ is 14.47% and 49.6% $SO_4$. The decomposed sample contains about 4% less than the theoretical amount of nitrogen (ammonia) for the diammine compound.

EXAMPLE 9

Pentlandite ore from Sudbury, Ontario, Canada —150 mesh (that is passed through a 150 mesh Tyler screen) with analyses shown in Table 7 was subjected to ammonia leach with 10 g Pentlandite in 50 ml $NH_4OH$, 300 psig autogeneous total pressure with $O_2$ (60 psig initially at 25°C) at 150°C for 1 hour. The solution was filtered to remove iron oxide ad residue. The filtrate was pressurized with $NH_3$ to precipitate the metal complex, as shown in Example 6. The precipitated ammine complex was thermally decomposed in an air stream at 175°C for 30 min. Analysis of the dried light green product shows 24% $NH_3$ and 71% $SO_4$. Since the percent sulfur in the ore is 31.3%, the amount of $(NH_4)_2SO_4$ produced is about 16 times greater than the amount of nickel ammine complex produced. The % $NH_3$ and $SO_4$ theoretically would be 25.2% and 71.1%, respectively. Thus the decomposition product at 175°C, 30 min, has slightly less than 2 to 1 $NH_3$ to $SO_4$.

EXAMPLE 10

A complex sample is decomposed as in Example 9 with 4.1 g being decomposed at 30 min at 100°C in oven. Analyses show 23 wt % $NH_3$ and 71.2 wt % sulfate. Nickel ammine sulfate product will have the proper $NH_3$ to sulfate ratio. This is almost 2 to 1 for this ore.

EXAMPLE 11

A partially decomposed sample of diammine nickel sulfate was dissolved in water at room temperature with 1.5 g dissolved in 7.7 g $H_2O$. The concentration of the solution was 50.8 g $Ni^{++}$/liter and the pH was 7.4. The solution is dark blue. The partially decomposed nickel ammine shows high solubility and an appropriate pH for further treatment, e.g. $H_2$ reduction or electrowinning.

EXAMPLE 12

If a slightly low pH (i.e., 7 or less) is desired, a slightly longer decomposition period or at a slightly higher temperature can be used for a low $NH_3$ sulfate ratio, e.g., less than 7. It may be desirable to achieve faster $H_2$ reduction with a solution pH slightly below 7. Heating at 275°C for 1 hour without air passage produces a yellowgreen solid with 19.7 wt % $NH_3$. The pH of a 10 wt % solution of this product was 6.9.

EXAMPLE 13

A high carbonaceous silver copper containing ore from Canada, is ground to −14 mesh, that is, it passes through a 14 mesh Tyler screen. It contained 0.30 wt % Cu, copper, and 3.8 troy ounces/ton of silver. 20 g ore −14 mesh is mixed with 70 g $NH_4OH$ and stirred under $O_2$ pressure (60 psig initially) at 150°C for 2 hours under autogeneous pressure of about 400 psig. The total Cu recovery was 75.4 wt % and total silver recovery was 74 wt % from the ammonia leach.

The complex is partially or thoroughly decomposed by heat and then treated by known separation-recovery methods. The decomposed complex is redissolved in solvent for recovery of metal values. The solution treated by known separation methods can be recovered as solid ammine complex by ammonia pressurization and metal values separation.

TABLE 1

| Chalcopyrite Ore Source | Raw Materials ANALYSIS, WT PERCENT | | | | | Molar Ratio S:Cu |
|---|---|---|---|---|---|---|
| | Cu | Fe | S | Zn | Pb | |
| A. Temagami, Ontario | 32.2 | 30.3 | 35.3 | 0.1 | 0.4 | 2.18 |
| B. Arizona Porphoryl | | | | | | |

TABLE 1-continued

| Chalcopyrite Ore Source | Raw Materials ANALYSIS, WT PERCENT | | | | | Molar Ratio S:Cu |
|---|---|---|---|---|---|---|
| | Cu | Fe | S | Zn | Pb | |
| Flotation Concentrate | 25.2 | 25.4 | 29.5 | 0.9 | 0.1 | 2.14 |

TABLE 2

Copper Recovery as Function of Ore Particle Size

| Particle Size | % Recovery[a] |
|---|---|
| −150 mesh | 97.7 |
| −325 mesh | 98.0 |

[a]Conditions of reaction: 1 hour, 150°C, 300 psig total gas pressure with $O_2$ ($O_2$ pressure at STP 1.59 atm (22.5 psig).

TABLE 3

Copper Recovery as Function of Time, Temperature, and $O_2$ Pressure

Percent Recovery[a]
200 psig Total Gas Pressure with $O_2$

| | 100°C | 125°C | 150°C |
|---|---|---|---|
| 30 min | 61.8% | 75.3% | — |
| 60 min | 83.3 | 95.7 | — |
| 120 min | >97.0 | — | — |
| 180 min | >98.0 | >98.0 | — |
| Oxygen Pressure at STP (atm) | 4.64 | 1.21 | |
| (psig) | 65.9 | 17.1 | |

300 psig Total Gas Pressure with $O_2$

| | 75°C | 100°C | 125°C | 150°C |
|---|---|---|---|---|
| 30 min | | 64.7% | 90.0% | 97.0% |
| 60 min | | 91.4 | 97.0 | 97.7 |
| 120 min | | >98.0 | >98.0 | >98.0 |
| 180 min | | >98.0 | — | — |
| 2.5 hr | 36.8% | | | |
| 8.0 hr | 96.6 | | | |
| Oxygen Pressure at STP (atm) | 12.6 | 9.8 | 6.04 | 1.59 |
| (psig) | 179.0 | 139 | 85.7 | 22.5 |

400 psig Total Gas Pressure with $O_2$

| | 100°C | 125°C | 150°C |
|---|---|---|---|
| 30 min | 90.7% | 94.4% | 96.7% |
| 60 min | 96.4 | >98.0 | >98.0 |
| Oxygen Pressure at STP (atm) | 14.95 | 10.87 | 6.1 |
| (psig) | 212.2 | 154.4 | 87.1 |

[a]−150 mesh: passes through 150 mesh Tyler screen.

TABLE 4

Composition of Ammonia Precipitated Copper Complex $Cu(NH_3)_4SO_4 \cdot H_2O$
MOLECULAR WT 245.5

| | | Theo. Wt % | Found Wt % |
|---|---|---|---|
| Oven Dried (100°C) Sample | Cu | 25.9 | 26.4 |
| | $SO_4$ | 39.1 | 40.0 |
| | N | 22.8 | 23.2 |

$Cu(NH_3)_4(H_2O)_2SO_4 \cdot H_2O$
MOLECULAR WT 281.5

| | | Theo. Wt % | Found Wt % |
|---|---|---|---|
| Air Dried Sample | Cu | 22.6 | 22.6 |
| | $SO_4$ | 34.1 | 34.3 |
| | N | 19.9 | 21.2 |

TABLE 5

Decomposition of Copper Ammine Complex

| Time (Min) | Temp. (°C) | % $NH_3$ Remaining |
|---|---|---|
| 30 | 340 | |
| + | | 2.89 |
| 45 | 380 | |
| 30 | 340 | |
| + | | 0.39 |
| 60 | 380 | |
| 30 | 340 | |

TABLE 5-continued

Decomposition of Copper Ammine Complex

| Time (Min) | Temp. (°C) | % $NH_3$ Remaining |
|---|---|---|
| + | | 0.041 |
| 75 | 380 | |
| 30 | 340 | |
| + | | 0.046 |
| 90 | 370 | |

TABLE 6

| Sample | Treatment | Temp. °C | Time (Hours) | REMAINING % $NH_3$ | % $SO_4$ | Ratio $NH_3:SO_4$ |
|---|---|---|---|---|---|---|
| 6-1 | Sample dried at 100°C | 315 | 1.5 | 11.2 | — | — |
| 6-2 | Sample dried at 100°C | 290 | 1.5 | 14.1 | | |
| 6-3 | Sample dried at 100°C | 270 | 1.5 | 18.2 | | |
| 6-4 | Sample dried at 100°C | 275 | 1.0 | 19.7 | | |
| 6-5 | Sample dried at 100°C | 280 | 1.0 | 14.7 | | |
| 6-6 | Sample dried at 100°C | 90 | 60 | 21 | 58.4 | 0.359 |
| 6-7 | Sample dried at 100°C | 250 | 0.5 | 21 | 59 | 0.356 |
| 6-8 | Sample dried at 100°C | 225 | 1.0 | 22 | — | 0.354 |
| 6-9* | Sample dried at 100°C | — | — | 18.2 | 51.2 | |

*Standard: $Ni(NH_3)_2SO_4$ molecular weight 188.7

TABLE 7

Pentlandite Ore Analysis

| Ni | 4.76 % by weight |
|---|---|
| S | 31.3 |
| Fe | 49.97 |
| Cu | 0.73 |
| Zn | 0.28 |
| Ni to Cu ratio 6.5:1.0 | |

I claim:
1. A process for recovering metal values from a source material containing sulfides of copper and nickel comprising:
   a. leaching said source material with an oxidative ammonia leach solution;
   b. recovering a pregnant leach liquor containing leached metal values and sulfate values;
   c. adding a calcium salt or base to precipitate a portion of said sulfate values as calcium sulfate;
   d. pressurizing said pregnant leach liquor to at least 5 psig with ammonia to precipitate complexes of copper and nickel;
   e. recovering said complexes from said leach liquor and partially decomposing said complexes; and
   f. recovering copper and nickel from the partially decomposed complexes.

2. The process of claim 1 wherein said complexes are decomposed to the extent that the ratio of ammonia to sulfate in the complexes is in the range of 1.5 – 2.2:1.

3. The process of claim 2 wherein said ratio is about 2:1.

4. The process of claim 1 wherein said source material also contains leachable cobalt values which are leached during said leaching step and precipitated by said pressurizing with ammonia.

5. The process of claim 1 wherein said pregnant leach liquor is pressurized with ammonia at a pressure of about 65 psig.

6. The process of claim 1 wherein said complexes are heated at 250°c for about 0.5 hour during said partial decomposition.

* * * * *